US010286580B2

(12) United States Patent
Hinton

(10) Patent No.: US 10,286,580 B2
(45) Date of Patent: May 14, 2019

(54) SOAP RECYCLING ASSEMBLY

(71) Applicant: Herman Hinton, Homewood, AL (US)

(72) Inventor: Herman Hinton, Homewood, AL (US)

( * ) Notice: Subject to any disclaimer, the term of this patent is extended or adjusted under 35 U.S.C. 154(b) by 139 days.

(21) Appl. No.: 15/376,948

(22) Filed: Dec. 13, 2016

(65) Prior Publication Data

US 2018/0162015 A1 Jun. 14, 2018

(51) Int. Cl.
*B29C 35/12* (2006.01)
*C11D 13/00* (2006.01)

(52) U.S. Cl.
CPC .............. *B29C 35/12* (2013.01); *C11D 13/00* (2013.01)

(58) Field of Classification Search
CPC ................................ B29C 33/08; B29C 33/12
See application file for complete search history.

(56) References Cited

U.S. PATENT DOCUMENTS 4,030,867 A * 6/1977 Everman ................ C11D 13/16 219/421
4,296,064 A 10/1981 Satcher
4,917,589 A 4/1990 Manderson
5,511,882 A 4/1996 Anwunah
5,876,769 A 3/1999 Dowden et al.
D411,212 S 6/1999 Jones
6,152,294 A * 11/2000 Weinberg ................ A47K 5/03 206/77.1
6,565,818 B1 5/2003 Jarvinen
8,529,239 B1 9/2013 Black, Jr.
2008/0141452 A1* 6/2008 Karbowski ............ A47K 3/064 4/572.1
2009/0029891 A1 1/2009 Callahan
2011/0127245 A1 6/2011 Burrus
2015/0008620 A1* 1/2015 Welcome ............... C11D 13/16 264/320

* cited by examiner

*Primary Examiner* — Ryan M Ochylski

(57) ABSTRACT

A soap recycling assembly for recycling soap pieces into soap bars includes a housing that defines an internal space. A power module and a heater are coupled to the housing and are positioned in the internal space. The heater is selectively operationally couplable to the power module. A first recess is positioned in a top of the housing. A plurality of legs is pivotally coupled to a bottom of the housing. The legs are positioned to reversibly pivot from a stowed configuration to a deployed configuration, wherein the legs are positioned substantially perpendicular to the bottom. The first recess is configured to insert soap pieces. The power module is positioned to couple to the heater to heat the soap pieces to a melt. The power module is positioned to decouple from the heater wherein the melt solidifies to a bar of soap.

14 Claims, 3 Drawing Sheets

SOAP RECYCLING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to recycling assemblies and more particularly pertains to a new recycling assembly for recycling soap pieces into soap bars.

BRIEF SUMMARY OF THE INVENTION

An embodiment of the disclosure meets the needs presented above by generally comprising a housing that defines an internal space. A power module and a heater are coupled to the housing and are positioned in the internal space. The heater is selectively operationally couplable to the power module. A first recess is positioned in a top of the housing. A plurality of legs is pivotally coupled to a bottom of the housing. The legs are positioned to reversibly pivot from a stowed configuration to a deployed configuration, wherein the legs are positioned substantially perpendicular to the bottom. The first recess is configured to insert soap pieces. The power module is positioned to couple to the heater to heat the soap pieces to a melt. The power module is positioned to decouple from the heater wherein the melt solidifies to a bar of soap.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
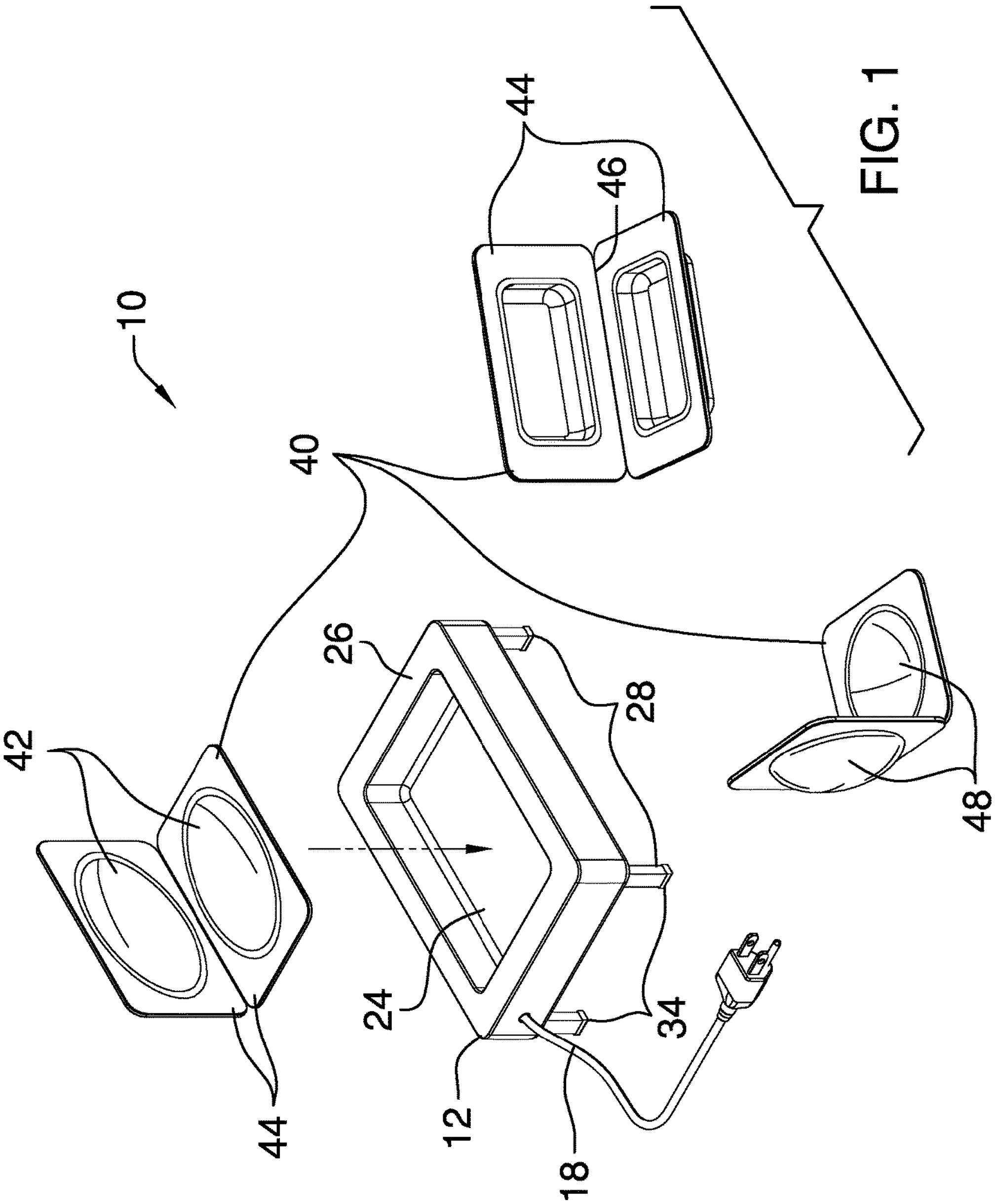
FIG. 1 is an isometric view of a soap recycling assembly according to an embodiment of the disclosure.
Figure 2:
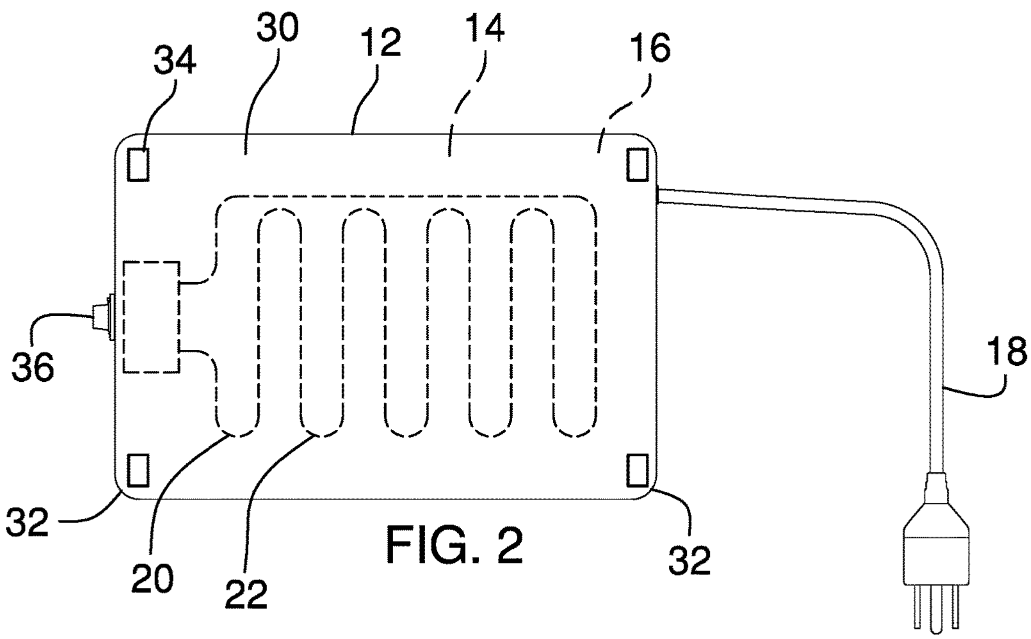
FIG. 2 is a bottom view of an embodiment of the disclosure.
Figure 3:
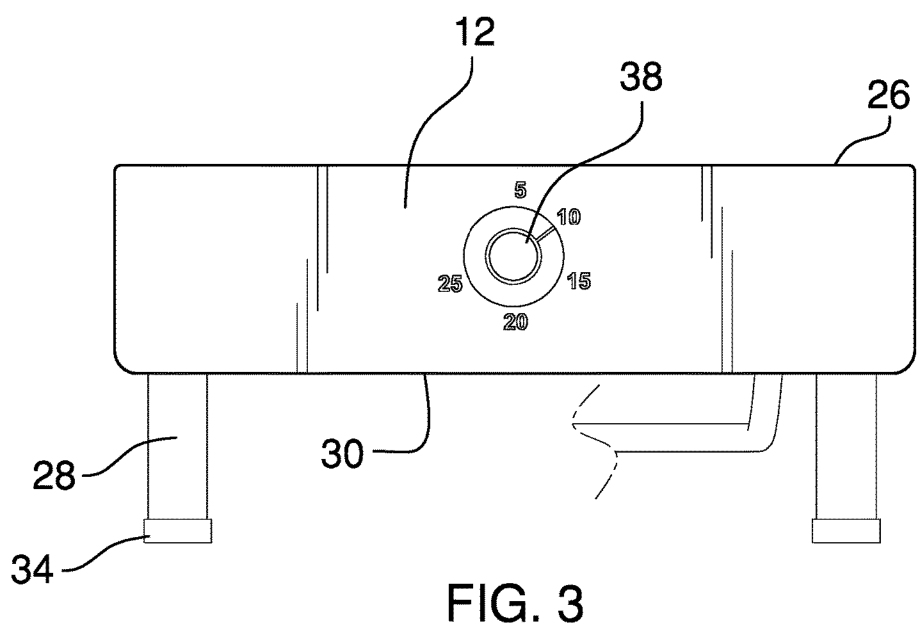
FIG. 3 is a front view of an embodiment of the disclosure.
Figure 4:
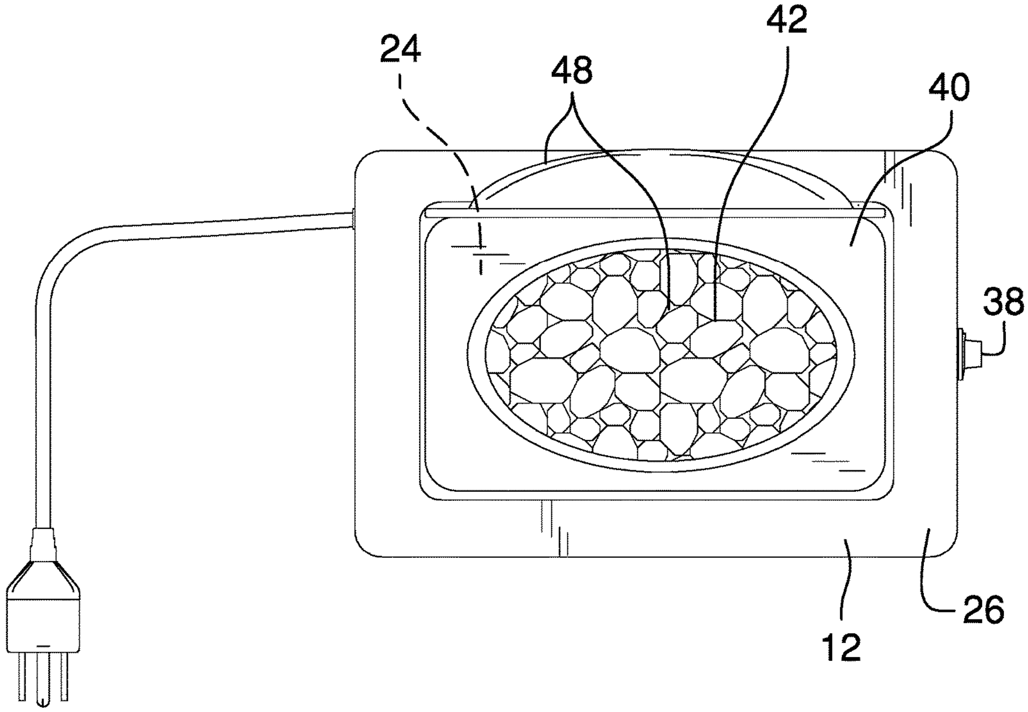
FIG. 4 is a top view of an embodiment of the disclosure.

With reference now to the drawings, and in particular to FIGS. 1 through 4 thereof, a new recycling assembly embodying the principles and concepts of an embodiment of the disclosure and generally designated by the reference numeral 10 will be described.

As best illustrated in FIGS. 1 through 4, the soap recycling assembly 10 generally comprises a housing 12 that defines an internal space 14. In one embodiment, the housing 12 is substantially rectangularly box shaped.

A power module 16 is coupled to the housing 12 and is positioned in the internal space 14. In one embodiment, the power module 16 comprises a cord 18 that is configured to couple to a source of alternating current.

A heater 20 is coupled to the housing 12 and is positioned in the internal space 14. The heater 20 is selectively operationally couplable to the power module 16. In one embodiment, the heater 20 comprises a heating element 22 that is loopedly positioned in the internal space 14.

A first recess 24 is positioned in a top 26 of the housing 12. The first recess 24 is configured to insert soap pieces. The power module 16 is positioned to couple to the heater 20. The heater 20 is configured to heat the soap pieces to a melt. The power module 16 is positioned to decouple from the heater 20. The melt solidifies to a bar of soap. In one embodiment, the first recess 24 is substantially rectangularly shaped.

A plurality of legs 28 is pivotally coupled to a bottom 30 of the housing 12. The legs 28 are positioned to reversibly pivot from a stowed configuration to a deployed configuration. In the stowed configuration, the legs 28 are positioned substantially parallel to the bottom 30. In the deployed configuration, the legs 28 are positioned substantially perpendicular to the bottom 30 and are configured to position the bottom 30 substantially parallel to a surface. In one embodiment, the plurality of legs 28 comprises legs 28 that are positioned singly proximate to each corner 32 of the housing 12. In another embodiment, the legs 28 are substantially rectangularly shaped when viewed longitudinally.

Each of a plurality of feet 34 is coupled to a respective leg 28 distal from the bottom 30 of the housing 12. The feet 34 are configured to grip the surface.

A controller 36 is coupled to the housing 12. The controller 36 is operationally coupled to the power module 16 and the heater 20. The controller 36 is positioned to selectively couple the power module 16 to the heater 20. In one embodiment, the controller 36 comprises a timer 38. The timer 38 is configured to set to a selected time such that the power module 16 is coupled to the heater 20 for the selected time.

The assembly 10 comprises a plurality of molds 40 that is complementary to and selectively insertable into the first recess 24. Each mold 40 has a profile 42. A respective mold 40 is positioned to insert into the first recess 24. The respective mold 40 imparts a respective profile 42 to the melt as the melt solidifies to the bar of soap.

In one embodiment, each mold 40 comprises a pair of panels 44 that each have an edge 46. The edges 46 are mutually hingedly coupled such that the panels 44 are clam shell structured. Each of a pair of second recesses 48 is positioned in a respective panel 44. The second recesses 48 are opposingly positioned and define the profile 42 of the mold. In another embodiment, the second recesses 48 are circularly shaped. In yet another embodiment, the second recesses 48 are ovally shaped. In still yet another embodiment, the second recesses 48 are rectangularly shaped.

In use, the legs 28 are positioned to reversibly pivot from the stowed configuration to the deployed configuration. In the stowed configuration, the legs 28 are positioned substantially parallel to the bottom 30. In the deployed configuration, the legs 28 are positioned substantially perpendicular to the bottom 30 and position the bottom 30 substantially parallel to the surface. The first recess 24 is positioned to insert the respective mold 40. The respective mold 40 is configured to insert the soap pieces. The timer 38 is configured to set to the selected time. The power module 16 is coupled to the heater 20 for the selected time to heat the soap pieces to the melt. The timer 38 is positioned to compel the power module 16 to decouple from the heater 20. The respective mold 40 is configured to impart the respective profile 42 to the melt as the melt solidifies to the bar of soap.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A soap recycling assembly comprising:

a housing defining an internal space;

a power module coupled to said housing and positioned in said internal space;

a heater coupled to said housing and positioned in said internal space, said heater being selectively operationally couplable to said power module;

a first recess positioned in a top of said housing;

a plurality of legs pivotally coupled to a bottom of said housing;

wherein said legs are positioned on said housing such that said legs are positioned for reversibly pivoting from a stowed configuration wherein said legs are positioned substantially parallel to said bottom, to a deployed configuration wherein said legs are positioned substantially perpendicular to said bottom and are configured for positioning said bottom substantially parallel to a surface, wherein said first recess is positioned in said housing such that said first recess is configured for inserting soap pieces, such that power module is positioned to couple to said heater such that said heater is positioned to heat the soap pieces to a melt and wherein said power module is positioned to decouple from said heater such that the melt solidifies to a bar of soap; and a controller coupled to said housing, said controller being operationally coupled to said power module and said heater, wherein said controller is positioned on said housing such that said controller is positioned for selectively coupling said power module to said heater, said controller comprising a timer, wherein said timer is positioned on said housing such that said timer is configured to be set to a selected time by a user such that said power module is coupled to said heater for the selected time.

2. The assembly of claim 1, further including said power module comprising a cord configured for coupling to a source of alternating current.

3. The assembly of claim 1, further including said heater comprising a heating element loopedly positioned in said internal space.

4. The assembly of claim 1, further including said housing being substantially rectangularly box shaped.

5. The assembly of claim 4, further including said first recess being substantially rectangularly shaped.

6. The assembly of claim 4, further including said plurality of legs comprising legs positioned singly proximate to each corner of said housing.

7. The assembly of claim 1, further including said legs being substantially rectangularly shaped when viewed longitudinally.

8. The assembly of claim 1, further including a plurality of feet, each said foot being coupled to a respective said leg distal from said bottom of said housing, wherein said feet are positioned on said legs such that said feet are configured for gripping the surface.

9. The assembly of claim 1, further including a plurality of molds complementary to and selectively insertable into said first recess, each said mold having a profile, wherein a respective said mold is positioned for inserting into said first recess such that said respective said mold imparts a respective said profile to the melt as the melt solidifies to the bar of soap.

10. The assembly of claim 9, further including each said mold comprising:

a pair of panels, each said panel having an edge, said edges being mutually hingedly coupled such that said panels are clam shell structured; and a pair of second recesses, each said second recess being positioned in a respective said panel such that said second recesses are opposingly positioned defining said profile of said mold.

11. The assembly of claim 10, further including said second recesses being circularly shaped.

12. The assembly of claim 10, further including said second recesses being ovally shaped.

13. The assembly of claim 10, further including said second recesses being rectangularly shaped.

14. A soap recycling assembly comprising:

a housing defining an internal space, said housing being substantially rectangularly box shaped;

a power module coupled to said housing and positioned in said internal space, said power module comprising a cord configured for coupling to a source of alternating current;

a heater coupled to said housing and positioned in said internal space, said heater being selectively operationally couplable to said power module, said heater comprising a heating element loopedly positioned in said internal space;

a first recess positioned in a top of said housing, wherein said first recess is positioned in said housing such that said first recess is configured for inserting soap pieces such that power module is positioned to couple to said heater such that said heater is positioned to heat the soap pieces to a melt and wherein said power module is positioned to decouple from said heater such that the melt solidifies to a bar of soap, said first recess being substantially rectangularly shaped;

a plurality of legs pivotally coupled to a bottom of said housing, wherein said legs are positioned on said housing such that said legs are positioned for reversibly pivoting from a stowed configuration wherein said legs are positioned substantially parallel to said bottom to a deployed configuration wherein said legs are positioned substantially perpendicular to said bottom and are configured for positioning said bottom substantially parallel to a surface, said plurality of legs comprising legs positioned singly proximate to each corner of said housing, said legs being substantially rectangularly shaped when viewed longitudinally;

a plurality of feet, each said foot being coupled to a respective said leg distal from said bottom of said housing, wherein said feet are positioned on said legs such that said feet are configured for gripping the surface;

a controller coupled to said housing, said controller being operationally coupled to said power module and said heater, wherein said controller is positioned on said housing such that said controller is positioned for selectively coupling said power module to said heater, said controller comprising a timer, wherein said timer is positioned on said housing such that said timer is configured to be set to a selected time by a user such that said power module is coupled to said heater for the selected time;

a plurality of molds complementary to and selectively insertable into said first recess, each said mold having a profile, wherein a respective said mold is positioned for inserting into said first recess such that said respective said mold imparts a respective said profile to the melt as the melt solidifies to the bar of soap, each said mold comprising:

a pair of panels, each said panel having an edge, said edges being mutually hingedly coupled such that said panels are clam shell structured, and a pair of second recesses, each said second recess being positioned in a respective said panel such that said second recesses are opposingly positioned defining said profile of said mold, said second recesses being circularly shaped, said second recesses being ovally shaped, said second recesses being rectangularly shaped; and wherein said legs are positioned for reversibly pivoting from the stowed configuration wherein said legs are positioned substantially parallel to said bottom, to the deployed configuration wherein said legs are positioned substantially perpendicular to said bottom and are configured for positioning said bottom substantially parallel to the surface, wherein said first recess is configured for inserting said respective said mold such that said respective said mold is configured for inserting the soap pieces, wherein said timer is positioned on said housing such that said timer is configured for setting to the selected time such that said power module is coupled to said heater for the selected time to heat the soap pieces to a melt and wherein said timer is positioned to compel said power module to decouple from said heater, wherein said respective said mold is configured for imparting said respective said profile to the melt as the melt solidifies to the bar of soap.

* * * * *